: 2,732,410
Patented Jan. 24, 1956

2,732,410

PROCESS FOR PREPARING TETRAFLUORO ETHYLENE BY REACTING CARBON AND A BINARY HALOGEN FLUORIDE

Mark W. Farlow, Holly Oak, and Earl L. Muetterties, Hockessin, Del., assignors to E. I. du Pont de Nemours and Company, Wilmington, Del., a corporation of Delaware No Drawing. Application January 12, 1955,
Serial No. 481,482

4 Claims. (Cl. 260—653)

This invention relates to a new process of preparing compounds containing only carbon and fluorine, or carbon, fluorine and another halogen, such compounds being called hereinafter fluorocarbons and halofluorocarbons. More particularly, the invention relates to a new process of preparing tetrafluoroethylene.

The fluorocarbons are known to possess considerable usefulness in many fields of applied chemistry. For example, they have demonstrated utility as dielectrics, refrigerant liquids and ingredients of insecticidal compositions (e. g., as propellants). Tetrafluoroethylene has already achieved outstanding commercial success in the form of its polymer. The halofluorocarbons are also extremely valuable compounds. For example, the chlorofluorocarbons find extensive use as refrigerant materials and the bromofluorocarbons as fire-extinguishing liquids.

This invention has as an object a new process for the preparation of tetrafluoroethylene. A further object is a process for the preparation of perhalocarbons containing fluorine. Other objects will appear hereinafter.

These objects are accomplished by the present invention wherein tetrafluoroethylene and other compounds containing only carbon and halogen are synthesized by bringing a binary halogen fluoride, i. e., a binary compound of fluorine with another halogen, in contact with carbon at a temperature above 1500° C., and removing any unreacted halogen fluoride and any free halogen of atomic number less than 53 from the reaction product as soon as possible after contact with the carbon.

In this reaction, the effluent gas after passage through the reaction zone normally contains, besides the reaction products, unchanged halogen fluoride and the free halogen, other than fluorine, corresponding thereto (fluorine is not present since it reacts instantly with the carbon). In order to obtain the desired tetrafluoroethylene by this process, it has been found essential to remove these contaminants from the reaction product as soon as possible after it leaves the reaction zone. If this is not done, tetrafluoroethylene is not obtained because the halogen fluorides and the more reactive halogens (chlorine and bromine) add rapidly to the double bond of tetrafluoroethylene. The presence of free iodine in the reaction product can be tolerated since it is less reactive with tetrafluoroethylene than the halogens of lower atomic number.

The halogen fluorides suitable for use in the process of this invention include chlorine I fluoride, ClF; chlorine III fluoride, ClF$_3$; bromine I, III and V fluorides, BrF, BrF$_3$, and BrF$_5$, respectively; iodine V fluoride, IF$_5$, and iodine VII fluoride, IF$_7$. These materials, which are gases or low boiling liquids, can be prepared by methods described in the literature. One of them, iodine V fluoride, IF$_5$, can be made without having resort to elemental fluorine by reacting iodine with silver I fluoride. For this reason, and also because it leads to good conversions to halocarbons containing very substantial amounts of tetrafluoroethylene, iodine V fluoride is the preferred starting material for use in this invention.

The process can be carried out in various ways. Thus, the vaporized halogen fluoride can be passed, if desired with an inert carrier gas such as nitrogen, argon or helium, through a column of carbon heated at a temperature of at least 1500° C. in a suitable reactor, e. g., a graphite tube placed inside a resistance furnace or an induction furnace. The gaseous reaction products are then immediately treated, as described below, to remove any unreacted halogen fluoride and any free chlorine or bromine, in order to minimize or eliminate the possibility of their reacting with the tetrafluoroethylene present in the reaction product. A preferred mode of operation consists in reacting the halogen fluoride with the carbon electrodes of a carbon arc, where the temperature is estimated to be in the range of 2500 to 3500–4000° C., and again immediately removing from the effluent gas any halogen fluoride and free reactive halogen which may be present. Preferably, the vaporized halogen fluoride is passed through the carbon arc, for example in an apparatus of the type described below. However, it is also possible to operate with the carbon arc submerged in the liquid halogen fluoride in a suitably designed apparatus permitting rapid escape of the volatile halocarbons containing the tetrafluoroethylene so that the effluent gas can be treated at once to free it from entrained halogen fluoride and halogen.

The removal of the unreacted halogen fluoride and free chlorine or bromine from the reaction product can be accomplished in various ways. The most effective method consists in treating the effluent gas, immediately after it leaves the reaction zone, with a chemical agent which destroys the halogen fluoride by hydrolysis or metathesis. Such agents include water, solid alkali metal hydroxides such as potassium or sodium hydroxides, aqueous solutions of the alkali metal hydroxides, carbonates, or sulfites, and the like. Suitable neutralizing agents for the unreacted halogen fluoride and corresponding halogen are the metal iodides and particularly the alkali metal iodides, particularly potassium iodide and sodium iodide, which can be used in the solid state or in aqueous solutions. These iodides and particularly the iodides of alkali forming metals, i. e., the alkali metals and alkaline earth metals are particularly useful when chlorine fluorides or bromine fluorides are used. These chemical absorbents are used in amounts at least stoichiometrically equivalent to the amount of halogen fluoride used for reacting with the carbon. Another method of removing the unchanged halogen fluoride and halogen from the reaction product consists in cooling it quickly to a temperature low enough to condense the halogen fluoride and halogen but not low enough to condense the tetrafluoroethylene. This cooling procedure is satisfactory when using bromine fluoride or iodine fluoride, but with the highly reactive and more volatile chlorine fluoride it should be replaced or complemented by chemical removal.

Regardless of whether physical or chemical means are adopted to remove the halogen fluoride and free halogen from the reaction product, this removal should be done as quickly as possible after effluent gas leaves the reaction zone. It is not possible to state, with extreme accuracy, the critical time limit but, for best results as regards the yield of tetrafluoroethylene, it is desirable that the effluent gas be treated for halogen fluoride removal within five seconds after leaving the reaction zone, and preferably within one second.

Moreover, conversions to tetrafluoroethylene are improved when the effluent gas is cooled as quickly as the physical features of the apparatus permit, since rapid quenching minimizes thermal conversion of tetrafluoroethylene to other products. More specifically, it is desirable to cool the reaction product to a temperature below about 400° C. within a very short time after it leaves the reaction zone, e. g., within ten seconds and preferably within less than five seconds.

It is desirable to carry out the reaction with an excess of carbon relative to the halogen fluoride, in order to convert as much as possible of the latter to fluorocarbons and halofluorocarbons. There is suitably used at least 3, and preferably at least 10, gram atoms of carbon per mole of halogen fluoride. A much greater excess of carbon can be used if desired.

Any form of carbon, whether amorphous or crystalline, is suitable for the purpose of this invention. Thus, there can be used coal, graphite, charcoal, the various forms of carbon black such as lamp black, acetylene black, bone black, etc. In general, higher conversions are obtained with active carbon, of which many well-known varieties are available commercially. Active carbon is very finely divided, porous carbon having a total surface area of at least 20 square meters per gram (Hassler, "Active Carbon," Chemical Publishing Co. 1951, p. 127). When using the carbon arc, the activity or state of subdivision of the carbon is apparently of no consequence, but the carbon must, of course, possess sufficient conductivity. The carbon need not be rigorously pure and it may, for example, contain the normal amount of ash, e. g., from 0.5 to 4% by weight in the case of most active carbons.

The reaction should of course be carried out under anhydrous conditions. It is often desirable to dehydrate the carbon prior to reaction, since carbon, especially of the active or absorbent variety, can retain significant amounts of water even at high temperatures.

At temperatures below about 1500° C., little or no tetrafluoroethylene is formed, even when the effluent gas is treated immediately for removal of the unchanged halogen fluoride. Other halocarbons are formed, and, in fact, their production begins at temperatures as low as about 350° C. However, in order to synthesize tetrafluoroethylene in more than trace amounts it is necessary to operate at temperatures above 1500° C. Temperatures in the range of 1500 to about 2300° C. can be obtained through the use of a resistance furnace or of an induction furnace, in which is placed a tubular reactor made of corrosion-resistant metal or of graphite. Higher temperatures can be obtained by using the carbon arc, as described in the examples below. The arc can be operated at low or high voltage and with either direct or alternating current. Good results are obtained when the reaction is carried out in electric arcs produced between carbon electrodes with a current of 10 to 50 volts and of 10 to 30 amperes, although electric arc operation is by no means limited to this range of voltage and amperage. Forms of carbon arc suitable for the purpose of this invention are illustrated in detail in application Ser. No. 409,484, filed by M. W. Farlow and E. L. Muettertites on February 10, 1954, and allowed on October 27, 1954 now U. S. Patent No. 2,709,186.

The absolute pressure in the reaction zone is not critical. In general, low pressures of the order of 1 to 50 mm. of mercury are preferred when operating with the carbon arc, since the operation of the arc becomes more difficult with higher pressures. Atmospheric or lower pressures can be used when operating with more conventional reactors such as a heated tube. The rate of passage of the halogen fluoride through the reaction zone should be as rapid as possible consistent with satisfactory conversions. Times of contact of the halogen fluoride with the carbon which are in the range of 0.1 to 30 seconds are suitable.

The reaction gives a mixture of products. Besides tetrafluoroethylene, there is always formed carbon tetrafluoride. In addition, the halofluoromethanes containing, besides fluorine, the halogen corresponding to the halogen fluoride employed, are present in the reaction product. These include, for example, chlorotrifluoromethane, dichlorodifluoromethane, bromotrifluoromethane, dibromodifluoromethane, and iodotrifluoromethane. Higher halocarbons, such as hexafluoropropane and octafluropropane, are formed in smaller amounts. These various products can be separated by fractionation in a low temperature, high pressure still.

The following examples in which parts are by weight are illustrative of the invention.

Example I

Bromine III fluoride, $BrF_3$, was reacted with the carbon electrodes of a carbon arc as follows: The anode was a hollow graphite cylinder, 5/16 inch outside diameter and 3/16 inch inside diameter, mounted on a copper tube. The cathode was a solid 5/16 inch graphite cylinder mounted on a copper tube having perforations near the end holding the cathode. The cathode was positioned with its end nearly flush with the open end of the hollow anode. The electrodes were mounted in a water-cooled, gas-tight glass jacket which was evacuated to a pressure of a few tenths of a millimeter of mercury. In the operation of this type of arc, the incoming gas flows out of the perforations in the copper tube around the carbon cathode and enters the hollow anode, passing through the burning arc at this point. The reaction product passes through the anode and out through the copper tube holding the anode.

The arc was operated at a voltage of 20 volts and a direct current of 16 amperes. The pressure on the inlet side of the arc was 3.5 mm. of mercury and that on the outlet side of the arc was 1 mm. of mercury. A total of 12 parts of bromine III fluoride was passed through the arc in a period of 10 minutes. The exit gases coming out of the arc were passed immediately through a trap cooled in a carbon dioxide/acetone bath, which served the double purpose of cooling the reaction product and removing from it, by condensation, the bromine and unreacted bromine III fluoride present. The residual gas coming out of this cold trap was then condensed by passage through two traps cooled in liquid nitrogen. There was obtained in these last two traps a total of 7 parts of condensed reaction product which was shown by infrared analysis to contain, on a molar basis, 40% bromotrifluoromethane, 45% carbon tetrafluoride, 10–15% tetrafluoroethylene, 1–2% hexafluoroethane, and some dibromodifluoromethane.

Example II

Iodine V fluoride, $IF_5$, was reacted with the carbon electrodes of the carbon arc described in Example I. The arc was operated at a voltage of 16–18 volts and a direct current of 21–25 amperes, and a total of 3.4 parts of iodine V fluoride was passed through it in a period of 5 minutes. The pressure on the inlet side of the arc was about 2.5 mm. of mercury, and less than 1 mm. of mercury on the outlet side. The exit gases were led immediately first through a trap cooled in a carbon dioxide/acetone bath, in which the iodine and unreacted iodine V fluoride condensed and separated from the reaction product, then through two traps cooled in liquid nitrogen. The product condensed in these last two traps (2.5 parts) was shown by infrared analysis to contain, on a molar basis, 25% carbon tetrafluoride, 20% tetrafluoroethylene, 10% hexafluoroethane, 20% iodotrifluoromethane, 2–5% carbonyl fluoride and traces of silicon tetrafluoride. The carbonyl fluoride was presumably formed owing to the presence of residual air in the reaction zone, and silicon tetrafluoride by the reaction of iodine V fluoride with the glass of the collection system.

Example III

Chlorine III fluoride, $ClF_3$, was reacted with the carbon electrodes of the carbon arc described in Example I. In this case, the copper electrode holders were cooled with water to prevent excessive reaction of the chlorine III fluoride with the metal. The arc was operated at a voltage of 18 volts and a direct current of 25 amperes. A total of 2 parts of chlorine III fluoride was passed through the arc in a period of 15 minutes. The exit gases from the reaction was led immediately through a tower packed with solid potassium iodide, which removed the chlorine and unreacted chlorine III fluoride from the reaction product. The purified gas was passed through a trap cooled in carbon dioxide/acetone to remove the iodine, then condensed in a trap cooled in liquid nitrogen. The condensate was shown by infrared analysis to contain, on a molar basis, 50% tetrafluoroethylene, 17% carbon tetrafluoride, 25% chlorotrifluoromethane, and 8% dichlorodifluoromethane.

In contrast to the above experiment, when chlorine III fluoride was passed through the carbon arc in the same manner but without treating the exit gas with an absorbent for chlorine and chlorine III fluoride, no tetrafluoroethylene was found in the reaction product, even when the latter was quickly quenched by passing it through a trap at −130° C.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process for the preparation of tetrafluoroethylene which comprises reacting carbon, at a temperature of at least 1500° C. with a binary halogen fluoride and immediately thereafter removing the halogen fluoride and any halogen of atomic number less than 53 from the reaction product.

2. The process for the preparation of tetrafluoroethylene which comprises reacting carbon, at a temperature of at least 1500° C. with a binary compound of fluorine with another halogen and immediately thereafter removing the halogen fluoride and any halogen of atomic number less than 53 from the reaction product.

3. The process for the preparation of tetrafluoroethylene which comprises reacting carbon, at a temperature of at least 1500° C. with iodine V fluoride and immediately thereafter removing the unreacted iodine fluoride from the reaction product.

4. In the preparation of tetrafluoroethylene the step which comprises reacting carbon, at a temperature of at least 1500° C. with a binary compound of fluorine with another halogen.

References Cited in the file of this patent

UNITED STATES PATENTS

| | | |
|---|---|---|
| 2,709,184 | Muetterties | May 24, 1955 |
| 2,709,185 | Muetterties | May 24, 1955 |